3,658,901
CYANODITHIOIMIDOCARBONATES

Richard J. Timmons, 222 Grand Ave., and Lawrence S. Wittenbrook, 720 W. 5th St., both of Marysville, Ohio 43040
No Drawing. Continuation-in-part of application Ser. No. 578,974, Sept. 13, 1966. This application June 18, 1969, Ser. No. 834,510
Int. Cl. C07c 12/00
U.S. Cl. 260—551 C   5 Claims

ABSTRACT OF THE DISCLOSURE

Unsymmetrical esters of cyanoimidodithiocarbonic acid and their production and uses.

RELATION TO OTHER APPLICATIONS

This application is a continuation-in-part of application No. 578,974 filed September 13, 1966, now abandoned.

The present invention relates to novel unsymmetrical mono and diesters of cyanoimidodithiocarbonic acid having the formula

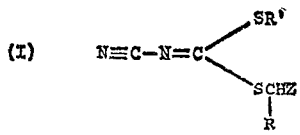

where:

R is hydrogen or alkyl;
Z is hydrogen, alkyl, vinyl, substituted vinyl, phenyl, substituted phenyl, allyl, substituted allyl, alkoxy, alkoxyalkyl, carbamoyl, carboalkoxy, or cyano, or a heterocyclic radical;
R' is an alkali metal, an alkaline earth metal, methyl, or substituted methyl; and
CHZR is different from R'.

Preferred are those compounds of Formula I where:
R is hydrogen or $C_1$–$C_4$ alkyl;
Z is hydrogen; $C_1$–$C_9$ alkyl; vinyl; halogen substituted vinyl; phenyl; phenyl substituted by one or more of the following: halogen, nitro, $C_1$–$C_4$ alkoxy, and $C_1$–$C_4$ alkyl; allyl; halogen substituted allyl; $C_1$–$C_4$ alkoxy; $C_1$–$C_4$ alkoxymethyl; $C_1$–$C_4$ alkoxy-ethyl; carbamoyl; $C_1$–$C_4$ carboalkoxy; pyridinyl; pyrimidyl; furyl; thienyl; or cyano; and R' is sodium; potassium; calcium; magnesium; methyl; or methyl substituted with one or more of the following: $C_1$–$C_4$ alkyl, cyano, $C_1$–$C_4$ carboalkoxy, phenyl, and phenyl with one or more substituents selected from halogen, nitro, $C_1$–$C_4$ alkoxy, and $C_1$–$C_4$ alkyl.

The following are representative of the compounds of the present invention:

Potassium methyl cyanoimidodithiocarbonate
Potassium isopropyl cyanoimidodithiocarbonate
Potassium n-butyl cyanoimidodithiocarbonate
Potassium n-hexyl cyanoimidodithiocarbonate
Potassium n-decyl cyanoimidodithiocarbonate
Potassium s-butyl cyanoimidodithiocarbonate
Potassium benzyl cyanoimidodithiocarbamate
Potassium p-nitrobenzyl cyanoimidodithiocarbonate
Potassium (3,4-methylenedioxy)benzyl cyanoimidodithiocarbonate
Potassium pentafluorobenzyl cyanoimidodithiocarbonate
Potassium allyl cyanoimidodithiocarbonate
Potassium 2-chloroallyl cyanoimidodithiocarbonate
Potassium 3,4,4-trifluoro-3-butene cyanoimidodithiocarbonate
Potassium methoxymethyl cyanoimidodithiocarbonate
Potassium 3-propanol cyanoimidodithiocarbonate
Potassium ethoxyethyl cyanoimidodithiocarbonate
Potassium ethoxycarbonylmethyl cyanoimidodithiocarbonate
Potassium α-acetanilido cyanoimidodithiocarbonate
Potassium α-acetamido cyanoimidodithiocarbonate
Potassium α-acetonitrile cyanoimidodithiocarbonate
Potassium γ-picolyl cyanoimidodithiocarbonate
Calcium butyl cyanoimidodithiocarbonate
Sodium butyl cyanoimidodithiocarbonate
Methyl n-butyl cyanoimidodithiocarbonate
Methyl allyl cyanoimidodithiocarbonate
Methyl 2-chloroallyl cyanoimidodithiocarbonate
Trimethylene bis-(2-chloroallyl cyanoimidodithiocarbonate)
n-Butyl n-decyl cyanoimidodithiocarbonate
Ethyl isopropyl cyanoimidodithiocarbonate
Methyl α-acetanilido cyanoimidodithiocarbonate
Methyl N-ethylcarbamoylmethyl cyanoimidodithiocarbonate
Methyl carbamoylmethyl cyanoimidodithiocarbonate
Methyl carboxymethyl cyanoimidodithiocarbonate
Methyl carbethoxy cyanoimidodithiocarbonate
Methyl ethoxycarbonylmethyl cyanoimidodithiocarbonate
Methyl N,N-dimethylcarbamoylmethyl cyanoimidodithiocarbonate
Butyl ethoxycarbonylmethyl cyanoimidodithiocarbonate
Benzyl ethoxycarbonylmethyl cyanoimidodithiocarbonate
Methyl (3,4-methylenedioxy)benzyl cyanoimidodithiocarbonate
Methyl p-nitrobenzyl cyanoimidodithiocarbonate
Methyl benzyl cyanoimidodithiocarbonate
Methyl cyanomethyl cyanoimidodithiocarbonate
Methyl methoxymethyl cyanoimidodithiocarbonate The compounds of the present invention possess valuable pesticidal and other biological system growth regulating properties and are particularly distinguished by outstanding herbicidal, insecticidal, fungicidal, and fumigant type activities.

Compounds of the present invention having the formula

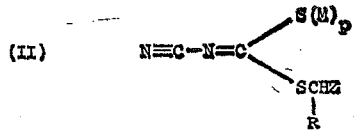

where R and Z have the meanings described above, M is an alkali or alkaline earth metal (preferably sodium, potassium, magnesium, or calcium), and $p$ is 1 when M is monovalent and ½ when M is divalent are additionally uniquely useful in that an entire class of novel 1,2,4-thiadiazoles [1] can be prepared from them. The latter possess valuable biological system growth regulating properties.

Compounds of the present invention which can be converted to particularly valuable 1,2,4-thiadiazoles and are therefore especially useful include, but are not necessarily limited to:

Potassium methyl cyanoimidodithiocarbonate
Potassium isopropyl cyanoimidodithiocarbonate
Potassium benzyl cyanoimidodithiocarbonate
Potassium allyl cyanoimidodithiocarbonate
Potassium ethoxyethyl cyanoimidodithiocarbonate
Potassium α-acetanilido cyanoimidodithiocarbonate

---

[1] Many of these compounds are described in detail in copending application No. 803,411 filed Feb. 28, 1969, which is hereby incorporated by reference.

Sodium n-butyl cyanoimidodithiocarbonate
Calcium n-butyl cyanoimidodithiocarbonate Those compounds of the present invention which are unsymmetrical monoesters of cyanoimidodithiocarbonic acid (compounds of the Formula I where R' is an alkali or alkaline earth metal) can be prepared from salts of cyanoimidodithiocarbonic acid.[2] Specifically, we have found that, when a cyanoimidodithiocarbonate disalt of the formula (III) 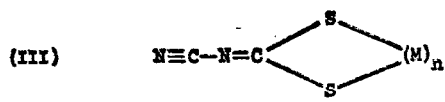

wherein M has the meaning assigned above and $n$ is 1 when M is divalent and 2 when it is monovalent is brought into contact with an equimolar quantity of a substituted alkylhalide having the formula

where R and Z have the meanings assigned above and X is chlorine, bromine, or iodine, a reaction occurs producing monoesters of cyanoimidodithiocarbonic acid having Formula II. This reaction is illustrated by the following equation:

Reaction 1:

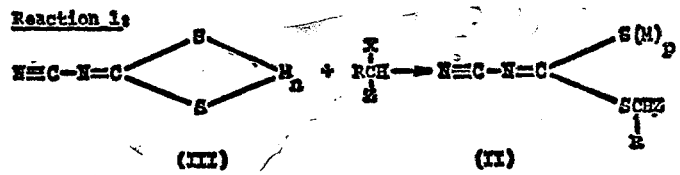

The other compounds of the present invention (unsymmetrical diesters of cyanoimidodithiocarbonic acid having the Formula I where R' is methyl or substituted methyl) can be prepared from compounds of the Formula II by reacting the latter with equimolar amounts of substituted alkylhalides having the Formula R'X where R' and X have the meanings assigned above and R'X is different from RCHZX. This reaction proceeds as follows:

Reaction 2:

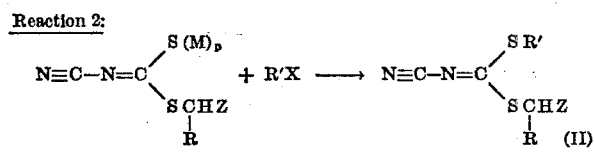

The novel reactions described above are preferably carried out at reduced temperatures initially, followed by a period at an elevated temperature (from 25° C. to the boiling temperature of the reaction mixture). The reactants are compatible with most solvent systems (e.g., water, alcohols, acetone, hydrocarbons, and chlorinated hydrocarbons).

Most of the novel unsymmetrical esters of the present invention are obtained in the form of crystalline solids which have melting points and can be recrystallized from conventional solvents. However, others are oils or hygroscopic liquids which can sometimes be distilled under reduced pressure.

In the heretofore reported reaction [3] most nearly resembling those of the present invention described above, symmetrical S,S-diesters of cyanoimidodithiocarbonic acid [4] are produced by reacting two moles of an alkyl-halide with one mole of the dipotassium salt of cyanoimidodithiocarbonic acid; i.e., by dialkylation of the disalt.

The novel stepwise, monoalkylation reactions described herein are of course quite different from that described in the preceding paragraph in that, insofar as diesters are concerned, those produced by the previously described reaction are symmetrical while those of the present invention are unsymmetrical. Moreover, the novel monoesters of the present invention are not produced by the previously reported reaction so that this reaction cannot be used to produce intermediates for the novel 1,2,4-thiadiazoles described in copending application No. 803,411.

In conjunction with the foregoing it is most unusual that Reaction 1 proceeds in the manner described above to produce the high yields we obtain in that the alkyl halide exhibits a preference for one of the two S-sites. From the D'Amico patent cited above and the other literature one would expect these sites to be unpreferentially alkylated. That is, if equimolar amounts of the disalt and alkyl halide were reacted, one would expect to obtain as the most likely result one-half mole of symmetrical diester and one-half mole of unreacted disalt.[5] Instead, as discussed above and as will become apparent from the working examples hereinafter, this does not occur. The alkyl halide instead shows a decided preference for one of the S-sites so that the product of the reaction is substantially the unsymmetrical monoester, not the symmetrical diester.

The novel unsymmetrical esters of the present invention of course differ structurally from the symmetrical diesters produced by the "prior art" reaction. The symmetrical and unsymmetrical esters are also quite dissimilar in the types of biological activity they possess. Moreover, the two types of esters differ in that, as mentioned above, the unsymmetrical esters of the present invention can be used to prepare the novel 1,2,4-thiadiazoles described in application No. 803,411 while the symmetrical esters cannot.

From the foregoing it will be apparent that one primary and important object of the invention resides in the provision of new and novel unsymmetrical mono and diesters of cyanoimidodithiocarbonic acid.

A related and also important object of the invention is the provision of unsymmetrical cyanoimidodithiocarbonates having valuable pesticidal and growth regulating properties.

Yet another related and important object of the invention resides in the provision of novel processes for producing the unsymmetrical cyanoimidodithiocarbonates of the present invention.

Still another related and important object of the invention is the provision of unique synthetic intermediates which are unsymmetrical esters of cyanoimidodithiocarbonic acid.

Further objects and advantages and other novel features of the present invention will become apparent to those skilled in the arts to which this invention pertains from the following detailed description and discussion of exemplary embodiments of the invention and the appended claims.

The immediately succeeding examples illustrate the preparation of the novel unsymmetrical cyanoimidodithio-

---

[2] These precursor salts can be prepared by reacting carbon disulfide cyanamide with a base as described in Annalen 331, 265 (1904) or in aqueous solution from calcium cyanamide as shown in U.S. Pat. No. 2,816,136 to Pera.
[3] See, for example, U.S. Pat. No 3,299,129 to D'Amico.
[4] The symmetrical dimethyl ester of cyanoimidodithiocarbonic acid is also mentioned in U.S. Pat. No. 2,430,232 to Guy.
[5] At best one would expect to obtain a major proportion of the symmetrical diester and small, probably negligible, amounts of mono and dialkylated products with the remainder of the product the unreacted disalt.

carbonates contemplated by the present invention. These examples are for purposes of illustration only and are accordingly not intended to limit the scope of the invention.

EXAMPLE 1

Preparation of potassium methyl cyanoimidodithiocarbonate

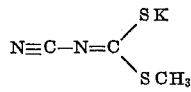

A solution of 150.0 g. (0.77 mole) of dipotassium cyanoimidodithiocarbonate in 615 ml. acetone and 690 ml. water was cooled to 0° C., and 109.2 g. (0.77 mole) of methyl iodide in 310 ml. acetone was added with stirring. After the addition was complete the reaction mixture was stirred for 0.5 hr. at 0° C. and then for 3.5 hr. at ambient temperature. The solution was then evaporated and the residue dried at 50° C. under vacuum. This gave 271.0 g. of solid, which was treated with 1625 ml. of acetone. The resulting slurry was filtered, giving 145 g. of potassium iodide. The filtrate was evaporated and the residue washed with two 650 ml. portions of ether, which gave 125 g. of crude product (95% yield), M.P. 215.5–218.0° C. The product was recrystallized from ethyl acetate-chloroform, giving 71.7 g. of product (47% yield), M.P. 214–216° C.

The potassium methyl cyanoimidodithiocarbonate prepared by this process was found to have the following elemental analysis:

Calculated for $C_3H_3KN_2S_2$ (percent): C, 21.15; H, 1.78; S, 37.66. Found (percent): C, 20.96; H, 1.88; S, 37.76.

The following compounds were prepared in an analogous manner, the yields ranging from 40 to 95%.

dried at 50° C. This sample was treated with 165 ml. of acetone and the resulting slurry filtered. The filtrate was evaporated, giving 21.5 g. (88%) of product, M.P. 206–212° C.

The potassium benzyl cyanoimidodithiocarbonate prepared by this process was found to have the following elemental analysis:

Calculated for $C_9H_7KN_2S_2$ (percent): C, 43.87; H, 2.86; S, 26.03. Found (percent): C, 41.23; H, 2.70; S, 22.87.

Due to the poor analysis the sample was identified as its 3-chloro-5-benzylthio-1,2,4-thiadiazole derivative by treatment with sulfanyl chloride (see patent application No. 803,411). The analysis of the thiadiazole was as follows:

Calculated for $C_9H_7ClN_2S_2$ (percent): C, 45.53; H, 2.91; S, 26.42. Found (percent): C, 45.05; H, 3.00; S, 26.66.

The following compounds were prepared in an analogous manner, giving 65 to 98% yields:

| Compound | Molecular formula | M.P. (° C.) | Element | Percent calculated | Percent found* |
|---|---|---|---|---|---|
| Potassium p-nitrobenzyl cyanoimidodithiocarbonate | $C_9H_6KN_3O_2S_2$ | 164–167 | N | 14.42 | 13.35 |
| Potassium (3,4-methylenedioxy) benzyl cyanoimidodithiocarbonate | $C_9H_5KN_2O_2S_2$ | 214–215.5 | N | 9.65 | 9.74 |
| Potassium pentafluorobenzyl cyanoimidodithiocarbonate | $C_9H_2F_5KN_2S_2$ | 210.5–212.5 | N | 8.33 | 8.42 |

*Those derivatives which showed a poor analysis were converted to the corresponding 1,2,4-thiadiazole derivative and identified as such (see patent application No. 803,411).

EXAMPLE 3

Preparation of potassium allyl cyanoimidodithiocarbonate

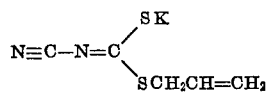

A solution of 48.5 g. (0.25 mole) of dipotassium cyanoimidodithiocarbonate in 210 ml. water and 185 ml. acetone was cooled to 0° C., and 30.2 g. of allylbromide in 90 ml. acetone was added with stirring. After the addition was complete the solution was stirred at room temperature for 16 hours. The solvent was then evaporated and the residue treated with 450 ml. acetone. The resulting slurry was filtered and the filtrate evaporated. This produced a residue which was treated with 250 ml. of ethyl acetate, giving a slurry which was filtered. The filtrate was then evaporated, giving 47.3 g. of potassium allyl cyanoimidodithiocarbonate (97% yield), M.P. 138.2–140° C.

The potassium allyl cyanoimidodithiocarbonate prepared by this process was found to have the following elemental analysis:

Calculated for $C_5H_5KN_2S_2$ (percent): C, 30.59; H, 2.57; N, 14.27; K, 19.91. Found (percent): C, 29.70; H, 2.45; N, 14.28; K, 20.30.

The following compounds were prepared in an analogous manner in yields ranging from 75 to 90%.

| Compound | Molecular formula | M.P. (° C.) | Element | Percent calculated | Percent found* |
|---|---|---|---|---|---|
| Potassium ethyl cyanoimidodithiocarbonate | $C_4H_5KN_2S_2$ | 149–152 | N | 15.20 | 14.84 |
| Potassium isopropyl cyanoimidodithiocarbonate | $C_5H_7KN_2S_2$ | 157–167 | N | 14.12 | 14.06 |
| Potassium n-butyl cyanoimidodithiocarbonate | $C_6H_9KN_2S_2$ | 157–167 | N | 13.19 | 12.77 |
| Potassium n-hexyl cyanoimidodithiocarbonate | $C_8H_{13}KN_2S_2$ | 160–170 | N | 11.65 | 11.67 |
| Potassium n-decyl cyanoimidodithiocarbonate | $C_{12}H_{21}KN_2S_2$ | 116–124 | N | 9.45 | 9.06 |
| Potassium s-butyl cyanoimidodithiocarbonate | $C_6H_{10}KN_2S_2$ | 180–186 | N | 13.13 | 15.56 |

*Samples that were difficult to analyze or gave a poor analysis were converted to the corresponding 1,2,4-thiadiazoles and identified as such (see application No. 803,411).

EXAMPLE 2

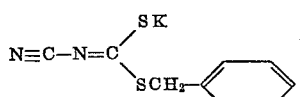

A solution of 19.4 g. (0.1 mole) of dipotassium cyanoimidodithiocarbonate in 61.5 ml. acetone and 69 ml. water was cooled to 0° C., and 12.7 g. (0.1 mole) of benzyl chloride was added in 31.5 ml. acetone with stirring. After the addition was complete the reaction mixture was stirred for 0.5 hr. at 0° C. and then for 3.5 hr. at ambient temperature. The solution was evaporated and the product

| Compound | Molecular formula | M.P. (° C.) | Element | Percent calculated | Percent found* |
|---|---|---|---|---|---|
| Potassium 2-chloroallyl cyanoimidodithiocarbonate | $C_5H_4ClKN_2S_2$ | 169–171 | N | 12.14 | 11.43 |
| Potassium 3,4,4-trifluoro-3-butene cyanoimidodithiocarbonate | $C_5H_4F_3KN_2S_2$ | 136.5–139.5 | N | 10.60 | 10.73 |

EXAMPLE 4

Preparation of potassium methoxymethyl cyanoimidodithiocarbonate

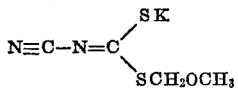

A solution of 8.7 g. (0.05 mole) of dipotassium cyanoimidodithiocarbonate in 20 ml. of water was cooled to 0° C., and 4.0 g. (0.05 mole) of chloromethyl methyl ether was added dropwise. After the addition was complete the slurry was stirred at 0° C. for 30 min. and at room temperature for 1 hour. The solvent was then evaporated at 40° C. under vacuum and the resulting residue treated with 25 ml. of acetone. The resulting slurry was filtered and the filtrate evaporated as above. The residue was treated with 25 ml. of ethyl acetate. The resulting slurry was filtered and the filtrate evaporated. This gave a product which, recrystallized from ethyl acetate benzene, produced 4.3 g. of sample (50% yield).

The potassium methoxymethyl cyanoimidodithiocarbonate prepared by this process was found to have the following elemental analysis:

Calculated for $C_4H_5KN_2OS_2$ (percent): C, 23.98; H, 2.52; N, 13.98; S, 32.01. Found (percent): C, 24.20; H, 2.10; N, 14.20; S, 32.32.

The following compounds were prepared in an analogous manner in yields ranging from 30 to 80%.

acetate chloroform, giving 20 g. of yellow solid (82.5% yield), M.P. 93–97° C.

The potassium ethoxycarbonylmethyl cyanoimidodithiocarbonate prepared by this process was found to have the following elemental analysis:

Calculated for $C_6H_7KN_2O_2S_2$ (percent): C, 29.74; H, 2.91; N, 11.56. Found (percent): C, 29.50; H, 2.81; N, 11.76.

The following compounds were prepared in an analogous manner in yields ranging from 70 to 100%:

| Compound | Molecular formula | M.P. (° C.) | Element | Percent calculated | Percent found |
|---|---|---|---|---|---|
| Potassium α-acetanilido cyanoimidodithiocarbonate | $C_{10}H_8KN_3O_2S_2$ | 93–97 | N | 14.52 | 14.73 |
| Potassium α-acetamide cyanoimidodithiocarbonate | $C_4H_4KN_3OS_2$ | 161–163 | N | 19.70 | 19.68 |
| Potassium cyanomethyl cyanoimidodithiocarbonate | $C_4H_2KN_3S_2$ | 165–167 | N | 21.52 | 21.65 |
| Potassium γ-picolyl cyanoimidodithiocarbonate | $C_8H_6KN_3S_2$ | 160–170 | N (dec.) | 16.99 | 16.01 |

EXAMPLE 6

Preparation of calcium n-butyl cyanoimidodithiocarbonate

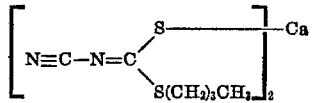

A solution of 8.6 g. (0.055 mole) of calcium cyanoimidodithiocarbonate in 50 ml. water was cooled to 0° C., and 7.58 g. (0.055 mole) of n-butylbromide in 30 ml. acetone was added with stirring. After the addition was complete the solution was stirred at room temperature overnight. The solution was then evaporated and the residue treated with 200 ml. of ether, resulting in the formation of two layers. The lower layer was separated and dried, giving 3.5 g. of calcium bromide. The upper layer was evaporated and the resulting residue treated with 100 ml. of benzene. The resulting slurry was filtered, giving 5 g. (50% yield) of product, M.P. 227–231° C.

The calcium n-butyl cyanoimidodithiocarbonate prepared by this process was found to have the following elemental analysis:

Calculated for $C_{12}H_{18}CaN_4S_4 \cdot H_2O$ (percent): C, 35.62; H, 4.98; Ca, 9.91. Found (percent): C, 35.60; H, 4.98; Ca, 9.89.

The following compound was prepared in an analogous manner in a yield of 50%:

Compound—Sodium butyl cyanoimidodithiocarbonate
Molecular formula—$C_6H_9NaN_2S_2$
M.P. (° C.)—200–202
Element—N
Percent calculated—14.27
Percent found—14.23

| Compound | Molecular formula | M.P. (° C.) | Element | Percent calculated | Percent found |
|---|---|---|---|---|---|
| Potassium 3-propanol cyanoimidodithiocarbonate | $C_5H_7KN_2OS_2$ | 124–137 | N | 13.07 | 13.17 |
| Potassium ethoxyethyl cyanoimidodithiocarbonate | $C_6H_9KN_2OS_2$ | | N | | (*) |

*Due to the extremely hygroscopic nature of this sample it was identified as its 1,2,4-thiadiazole derivative.

EXAMPLE 5

Preparation of potassium ethoxycarbonylmethyl cyanoimidodithiocarbonate

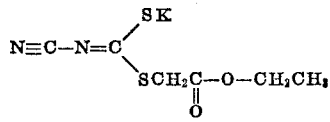

A solution of 19.4 g. of dipotassium cyanoimidodithiocarbonate (0.1 mole) in 75 ml. water and 75 ml. acetone was cooled to 0° C., and a solution of 11.8 g. of ethyl chloroacetate (0.1 mole) in 50 ml. acetone was added with stirring. After the addition was complete the reaction mixture was stirred for 30 minutes at 0° C. and for 13.5 hours at room temperature. The solvent was then evaporated and the residue treated with 100 ml. of acetone. The resulting slurry was filtered and the filtrate evaporated, giving 25.6 g. of a yellow oil. This sample was dried under high vacuum and recrystallized from ethyl

EXAMPLE 7

Preparation of methyl n-butyl cyanoimidodithiocarbonate

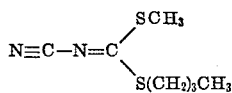

A solution of 9.7 g. (0.05 mole) of dipotassium cyanoimidodithiocarbonate in 50 ml. water and 40 ml. acetone was cooled to 0° C., and a solution of 7.1 g. (0.05 mole) of iodomethane in 20 ml. acetone was added with stirring. After the addition the solution was stirred at room temperature for 3 hours, and a solution of 6.8 g. (0.05 mole) of 1-bromobutane in 20 ml. acetone was added temperature. The solvent was stirred overnight at room temperature. The solvent was then evaporated and the resulting semisolid treated with 150 ml. of chloroform, producing a slurry. This slurry was filtered and the filtrate evaporated, giving 5 g. of an oil. This sample was distilled, giving 3 g. of liquid (37% yield,) B.P. 105.5–106.5° C. at 0.15 mm. of Hg.

The methyl n-butyl cyanoimidodithiocarbonate prepared by this process was found to have the following elemental analysis:

Calculated for $C_3H_3KN_2S_2$ (percent): C, 44.65; H, 6.42; N, 14.88; S, 34.05. Found (percent): C, 42.37; H, 5.61; N, 15.02; S, 34.30.

The following compounds were prepared in an analogous manner in yields ranging from 60 to 90%.

and 25 ml. water was added 2.4 g. of methyl iodide (0.0717 mole) with stirring. After the addition was complete the solution was stirred overnight at room temperature. The resulting slurry was evaporated under vacuum at 40° C. This produced a solid which was treated with 100 ml. of water and filtered, giving 4.6 g. of solid after drying (100% yield), M.P. 158–160° C.

The methyl α-acetanilido cyanoimidodithiocarbonate prepared by this process was found to have the following elemental analysis:

Calculated for $C_{11}H_{11}N_3OS_2$ (percent): C, 49.79; H, 4.18; N, 15.83 S, 24.17. Found (percent): C, 50.50; H, 3.89; N, 15.88; S, 23.82.

The following compounds were prepared in an analogous manner in yields ranging from 10 to 80%:

| Compound | Molecular formula | M.P. (° C.) | Element | Percent calculated | Percent found |
|---|---|---|---|---|---|
| Methyl ethylcarbamoylmethyl cyanoimidodithiocarbonate | $C_7H_{11}N_3OS_2$ | 125–126 | S | 29.51 | 29.26 |
| Methyl carbamoylmethyl cyanoimidodithiocarbonate | $C_5H_7N_3OS_2$ | 152–154 | S | 33.88 | 33.65 |
| Methyl carboxymethyl cyanoimidodithiocarbonate | $C_5H_6N_2O_2S_2$ | 105–109 | S | 33.71 | 33.29 |
| Methyl carbethoxy cyanoimidodithiocarbonate | $C_6H_8N_2O_2S_2$ | (*) | S | 31.39 | 31.68 |
| Methyl ethoxycarbonylmethyl cyanoimidodithiocarbonate | $C_7H_{10}N_2O_2S_2$ | 34–36 | C H S | 38.51 4.62 29.38 | 37.72 4.99 28.74 |
| Methyl N,N-dimethyl carbamoylmethyl cyanoimidodithiocarbonate | $C_7H_{11}N_3OS_2$ | 102.7–103.2 | C H S | 38.69 5.10 29.51 | 39.34 5.18 28.72 |
| Ethoxycarbonylmethyl butyl cyanoimidodithiocarbonate | $C_{10}H_{16}N_2O_2S_2$ | (*) | N | 10.76 | 10.84 |
| Ethoxycarbonylmethyl benzyl cyanoimidodithiocarbonate | $C_{13}H_{14}N_2O_2S_2$ | (*) | N | 9.4 | 9.55 |

*Melting point not recorded because material is a viscous oil.

EXAMPLE 8

Preparation of methyl α-acetanilido cyanoimidodithiocarbonate

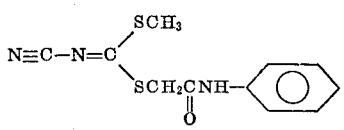

To a solution of 4.8 g. (0.017 mole) of potassium α-acetanilido cyanoimidodithiocarbonate in 50 ml. acetone

EXAMPLE 9

Preparation of methyl 3,4-(methylenedioxy)benzyl cyanoimidodithiocarbonate

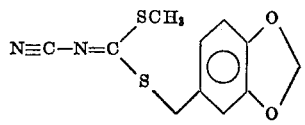

To a solution of 5.7 g. (0.033 mole) of potassium methyl cyanoimidodithiocarbonate in 10 ml. of acetone was added with stirring 5.7 g. of piperonylchloride in 10 ml. of acetone. After the addition was complete the solution was stirred overnight at room temperature. The resulting slurry was filtered and the filtrate evaporated, giving 7.6 g. of solid. Recrystallization from ethanol gave 4 g. of solid (45% yield), M.P., 81–82.5° C.

The methyl 3,4-(methylenedioxy)-benzyl cyanoimidodithiocarbonate obtained by this process was found to have the following elemental analysis:

Calculated for $C_{11}H_{10}N_7O_2S_2$ (percent): C, 49.60; H, 3.78; N, 10.52; S, 24.08. Found (percent): C, 49.10; H, 3.26; N, 10.09; S, 23.63.

The following compounds were prepared in an analogous manner in yields ranging from 10 to 80%:

| Compound | Molecular formula | M.P. (° C.) | Element | Percent calculated | Percent found |
|---|---|---|---|---|---|
| Methyl allyl cyanoimidodithiocarbonate | $C_6H_8N_2S_2$ | (*) | S | 37.23 | 38.34 |
| Methyl 2-chloroallyl cyanoimidodithiocarbonate | $C_6H_7ClN_2S_2$ | (*) | S | 31.02 | 32.30 |
| Trimethylene bis(2-chloroallyl) cyanoimidodithiocarbonate | $C_{13}H_{14}Cl_2N_4S_4$ | (*) | N | 13.17 | 12.88 |
| n-Butyl n-decyl cyanoimidodithiocarbonate | $C_{16}H_{30}N_2S_2$ | (*) | N | 8.93 | 9.03 |
| Ethyl isopropyl cyanoimidodithiocarbonate | $C_7H_{12}N_2S_2$ | (*) | N | 14.9 | 14.93 |

*Melting point not recorded because material is a viscous oil.

| Compound | Molecular formula | M.P. (° C.) | Element | Percent calculated | Percent found |
|---|---|---|---|---|---|
| Methyl p-nitrobenzylcyanoimidodithiocarbonate | $C_{10}H_9N_3O_2S_2$ | 106–107.5 | N | 15.72 | 15.63 |
| Methyl benzyl cyanoimidodithiocarbonate | $C_{10}H_{10}N_2S_2$ | (*) | N | 12.60 | 12.47 |
| Methyl cyanomethyl cyanoimidodithiocarbonate | $C_5H_5N_3S_2$ | 59–60 | S | 37.45 | 37.84 |
| Methyl methoxymethyl cyanoimidodithiocarbonate | $C_5H_8N_2OS_2$ | (*) | C H S | 34.07 4.57 36.38 | 34.04 4.25 34.24 |

* Melting point not recorded because material is a viscous oil.

EXAMPLE 10

Preparation of methyl n-butyl cyanoimidodithiocarbonate

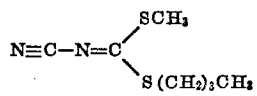

A 38.5 ml. fraction of a 1.3 molar solution of aqueous calcium cyanoimidadithiocarbonate (0.05 mole) was cooled to 5° C., and 6.8 g. of butyl bromide (0.05 mole) was added. The resulting slurry was stirred for 6 hours at room temperature. To this solution was added 7.1 g. of methyl iodide. The resulting slurry was stirred for 24 hours at room temperature. The solvent was then evaporated and the residual treated with 100 ml. of chloroform, giving a slurry which was filtered and dried over anhydrous magnesium sulfate. This gave 7.0 g. (74% yield) of product, B.P. 105–105° C. at 0.15 mm. of Hg.

Analysis confirmed that the product was the expected methyl n-butyl cyanoimidodithiocarbonate.

The following examples illustrate the exceptional capability the compounds of this invention have for regulating the growth of biological systems. Again, the examples are for purposes of illustration only and are not intended to limit the scope of the invention.

EXAMPLE 11

The compounds disclosed herein have a high degree of pre-emergence herbicidal activity. To demonstrate this, 25 parts of cyanoimidodithiocarbonate, 3 parts of polyoxyethylene sorbitan monolaurate (Tween 20—Atlas), and 4 parts of denatured alcohol (Synasol—Union Carbide) were thoroughly mixed together with a micromortar and pestle. This mixture was added to 1109 parts of denatured alcohol, and the resulting mixture was stirred into 5000 parts of sand. The sand mixture was stirred frequently at room temperature until dry.

The resulting granular composition was applied manually at a rate of 25 pounds per acre to flats sown with seeds of Poa pratensis (A), Poa annua (B), and Trifolium repens (C). Other flats similarly sown were left untreated as a comparative check. Twenty-one days after application percentage of control of germination was calculated using the plant material in the untreated flats as standards.

The results are tabulated below:

| Compound | Percent of control | | |
|---|---|---|---|
| | A | B | C |
| Methyl carbethoxy cyanoimidodithiocarbonate | 100 | 100 | 100 |
| Potassium methoxymethyl cyanoimidodithiocarbonate | 97 | 60 | 33 |

As can be seen these exemplary compounds show outstanding pre-emergence activity.

EXAMPLE 12

The compounds of the present invention also possess a high degree of post-emergence herbicidal activity. This is shown by the tests discussed below.

Spray compositions were used in the tests. These were prepared in the following manner: One and four-tenths (1.4) parts of cyanoimidodithiocarbonate for a one pound per acre rate (6.8 parts for a five pound per acre rate), seven parts of polyoxyethylene sorbitan monolaurate, and 10 parts of denatured alcohol were thoroughly mixed together with a micromortar and pestle. The mixture was then diluted with 5000 parts of water.

The spray compositions were applied with a sprayer to Poa pratensis (A), Amaranthus retroflexus (B), Barbarea spp. (C), and Trifolium repens (D) when the first true leaves had appeared (approximately three weeks after sowing). Similar plants were left untreated as a comparative check.

Twenty-one days after application percentage of kill was calculated using untreated plants as standards. The results are tabulated below:

| Compound | Rate, pound/ acre | Percent kill | | | |
|---|---|---|---|---|---|
| | | A | B | C | D |
| Methyl N-ethyl carbamoylmethyl cyanoimidodithiocarbonate | 5 | 15 | 100 | 72 | 88 |
| Methyl carbethoxymethyl cyanoimidodithiocarbonate | 5 | 12 | 83 | 92 | 70 |
| Methyl allyl cyanoimidodithiocarbonate | 1 | 20 | 100 | 100 | 92 |
| Methyl 2-chloroallyl cyanoimidodithiocarbonate | 1 | 9 | 35 | 86 | 56 |

The tabulated data shows that the tested compounds have a high degree of post-emergence herbicidal activity and considerable selectivity. For example, even at the five pound rate, the compounds did not damage Kentucky bluegrass (Poa pratensis) to an unacceptable extent. Yet, at the same rate, they gave substantial to complete control of Amaranthus retroflexus; Barbarea spp. and Trifolium repens.

EXAMPLE 13

The compounds of the present invention also possess a high degree of fungicidal activity. This is shown by the following test:

For a 0.1 pound per acre rate of active material, 1 part of cyanoimidodithiocarbonate, 41 parts of polyoxyethylene sorbitan monolaurate, 396 parts acetone, and 500 parts water were mixed together with a micromortar and pestle.

A 0.2 milliliter portion of this mixture was mixed with 2.8 milliliters of water and 60 milliliters of nutritive agar. Twenty ml. of the resulting mixture was poured into a Petri dish and allowed to set.

Three-sixteenth (3/16) inch plugs of Rhizoctonia solani (A), Helminthosporium sativum (B), and Fusarium roseum (C) were placed on the agar mixture and incubated at 80° F. Similar fungal plugs were placed on untreated agar as a comparative check.

Seven days later percentage of kill was calculated using plugs on untreated agar as standards. The results are tabulated below:

| Compound | Rate, pound/ acre | Percent kill | | |
|---|---|---|---|---|
| | | A | B | C |
| Potassium methyl cyanoimidodithiocarbonate | 0.1 | 89 | 45 | 25 |
| Methyl methoxymethyl cyanoimidodithiocarbonate | 10 | 0 | 87 | |
| Methyl N,N-dimethylcarbamoyl cyanoimidodithiocarbonate | 10 | 100 | 100 | 100 |
| Methyl N-ethylcarbamoylmethyl cyanoimidodithiocarbonate | 10 | 100 | 100 | 100 |
| Methyl carbamoylmethyl cyanoimidodithiocarbonate | 10 | 40 | 100 | 95 |
| Methyl carbethoxymethyl cyanoimidodithiocarbonate | 10 | 88 | 100 | 99 |
| Methyl carboxymethyl cyanoimidodithiocarbonate | 10 | 100 | 100 | |
| Methyl allyl cyanoimidodithiocarbonate | 0.1 | 100 | 21 | 100 |
| | 10 | 100 | 100 | 100 |
| Methyl 2-chloroallyl cyanoimidodithiocarbonate | 10 | 100 | 100 | 95 |

The foregoing data shows that the compounds of the present invention possess a high degree of fungicidal activity, in some cases even at the remarkably low rate of 0.1 pound per acre.

EXAMPLE 14

The compounds of the present invention exhibit a high degree of insecticidal activity as shown by the data tabulated below which was obtained from tests on Drosophilia spp. (fruit flies).

This data also shows that the novel unsymmetrical esters of the present invention possess a much higher degree of insecticidal activity than the heretofore known symmetrical dimethyl ester of cyanoimidodithiocarbonic acid.

| Compound | Percent kill at— | | |
|---|---|---|---|
| | 1 hr. | 3 hrs. | 6 hrs. |
| Dimethyl cyanoimidodithiocarbonate | 0 | 20 | 40 |
| Methyl ethylcarbamoylmethyl cyanoimidodithiocarbonate | 0 | 100 | 100 |
| Methyl carbamoylmethyl cyanoimidodithiocarbonate | 0 | 100 | 100 |
| Methyl carbethoxy methyl cyanoimidodithiocarbonate | 0 | 100 | 100 |
| Methyl allyl cyanoimidodithiocarbonate | 0 | 100 | 100 |

In the test in which the above data was obtained the active compounds were mixed together with Tween 20 and water in amounts providing 100 p.p.m. of active ingredient. Filter paper discs were saturated with 1 cc. of the active ingredient solutions, placed in Petri dishes, and allowed to dry. Five flies were then placed in each dish together with food for the flies, and the dishes were covered and incubated at room temperature. Counts of living and dead flies were made and percentage of kill calculated at the intervals identified above.

EXAMPLE 15

Compounds of the present invention possess a high degree of biological growth regulatory activity in the vapor phase and are accordingly valuable as fumigants. For example, applied at a rate of 20 pounds per acre, potassium isopropyl cyanoimidodithiocarbonate gave a 100% kill and 100% inhibition of Barbarea spp. (winter cress).

In the test in which the foregoing data was obtained, ten seeds of the test plant were presoaked for six hours at room temperature and then seeded on blotting paper previously wetted with distilled water. The seeded blotting paper was then placed in a plastic box. The active compound (80 mg.) was mixed with 50 ml. of distilled water and stirred into 5 to 10 grams of soil in a small, open top container.

The container with the active ingredient was placed in the plastic box, which was covered. After 18 hours the container with the active ingredient was removed from the plastic box, which was then recovered and germinated for one week at alternating temperatures of 68 to 86° F. The plastic boxes were then removed from the germinator and percentage of kill and of reduction of germination (inhibition) calculated, using untreated seeds similarly germinated as standards.

For applications of the type just described the novel compounds disclosed herein can be formulated with a variety of carriers and adjuvants into solutions, emulsions, suspensions, emulsifiable concentrates, spray powders, pastes, soluble powders, dusts, granulates, etc. Furthermore, they may be present in such formulations in combination with one another and/or other active substances including, but not limited to, other pesticides and biological system growth regulators and plant nutrients. The following, which are hereby incorporated by reference, describe suitable carriers and adjuvants for the compounds described herein, other active ingredients with which they may be formulated, and suitable methods for preparing such formulations: U.S. Pats. Nos. 3,076,699 and 3,083,089 to Renner; Handbook of Insecticide Dust Diluents and Carriers, Watkins et al., Dorland Books, Caldwell, N.J. (1955); Chemistry of the Pesticides (3d Ed.), Frear, D. Van Nostrand Company, Inc., New York, N.Y.; Weed Control (2d Ed.), Robbins et al., McGraw-Hill Book Company, Inc., New York, N.Y.; Commercial Fertilizers (5th Ed.), Collings, McGraw-Hill Book Company, Inc., New York, N.Y.; and Farm Chemicals 1969 Handbook, Meister Publishing Co., Willoughby, Ohio.

Application rates for the novel compounds described herein will vary widely depending upon the compound, the use to which it is put, and the type of formulation in which it is incorporated. Typically, however, application rates will range from 0.1 to 10 pounds per acre when the compounds disclosed herein are employed as fungicides and from 1 to 25 pounds per acre when they are employed as herbicides. In any event appropriate application rates can be readily determined by those conversant with the arts to which the present invention relates.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A monoester of cyanoimidodithiocarbonic acid having the formula:

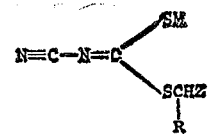

wherein:

(a) M is selected from the group consisting of the alkali metals;
(b) R is selected from the group consisting of hydrogen and $C_1$–$C_4$ alkyl; and
(c) Z is selected from the group consisting of hydrogen, $C_1$–$C_9$ alkyl, $C_2$–$C_3$ alkenyl, $C_2$–$C_3$ alkenyl substituted with 1–3 chlorine or fluorine atoms, phenyl, mononitrophenyl, pentafluorophenyl, $C_1$–$C_4$ alkoxy, hydroxy $C_1$–$C_3$ alkyl, $C_1$–$C_4$ alkoxymethyl, $C_1$–$C_4$ alkoxycarbonyl, carbamoyl, N-phenylcarbamoyl, and cyano.

2. The monoester of claim 1, where M is selected from the group consisting of potassium and sodium.

3. A monoester of cyanoimidodithiocarbonic acid having the formula:

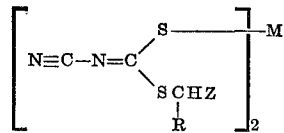

wherein:

(a) M is selected from the group consisting of the alkaline earth metals;
(b) R is selected from the group consisting of hydrogen and $C_1$-$C_4$ alkyl; and
(c) Z is selected from the group consisting of hydrogen, $C_1$-$C_9$ alkyl, $C_1$-$C_3$ alkenyl, $C_2$-$C_3$ alkenyl substituted with 1-3 chlorine or fluorine atoms, phenyl, mononitrophenyl, pentafluorophenyl, $C_1$-$C_4$ alkoxy, hydroxy $C_1$-$C_3$ alkyl, $C_1$-$C_4$ alkoxymethyl, $C_1$-$C_4$ alkoxycarbonyl, carbamoyl, N-phenylcarbamoyl, and cyano.

4. The monoester of claim 3, wherein M is selected from the group consisting of calcium and magnesium.

5. Potassium methyl cyanodithioimidocarbonate.

References Cited
UNITED STATES PATENTS 3,299,129   1/1967   D'Amico _____ 260—551
2,430,332   11/1957  Guy et al. _____ 260—551

HENRY R. JILES, Primary Examiner

H. I. MONATZ, Assistant Examiner

U.S. Cl. X.R.

260—256.5 R, 294.5 G, 329 ME, 340.3, 347.2, 481, 465.5 R, 561 S, 562 T; 71—90, 92, 88, 94, 98; 424—251, 263, 275, 278, 298, 304, 320, 324

UNITED STATES PATENT OFFICE
CERTIFICATE OF CORRECTION

Patent No. 3,658,901                    Dated April 25, 1972

Inventor(s) Richard J. Timmons and Lawrence S. Wittenbrook

It is certified that error appears in the above-identified patent and that said Letters Patent are hereby corrected as shown below:

Column 3, line 68, change "symmetrical" to --<u>symmetrical</u>--.

Column 5, after "Example 2", insert --Preparation of Potassium Benzyl Cyanodithioimidocarbonate--.

Column 6, line 9, change "26,03" to --26.03--.

Column 9, line 14, after "added" insert --with stirring.--.

Column 9, line 15, delete --temperature.--.

Column 9, line 15, change "solvent" to --solution--.

Column 10, line 12, after "15.83" insert --;--.

Column 11, line 16, change "105-105°" to --105-106°--.

Signed and sealed this 6th day of March 1973.

(SEAL)
Attest:

EDWARD M. FLETCHER, JR.　　　　　　　ROBERT GOTTSCHALK
Attesting Officer　　　　　　　　　　　Commissioner of Patents